US012283203B2

(12) United States Patent
Jikuhara et al.

(10) Patent No.: US 12,283,203 B2
(45) Date of Patent: Apr. 22, 2025

(54) INFORMATION PROCESSING APPARATUS, INFORMATION PROCESSING METHOD, AND MOBILE OBJECT

(71) Applicant: TOYOTA JIDOSHA KABUSHIKI KAISHA, Toyota (JP)

(72) Inventors: Yoshikazu Jikuhara, Miyoshi (JP); Yoshinori Kanemitsu, Tatekawa (JP); Yurika Tanaka, Yokosuka (JP); Keiichi Uno, Chita-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 164 days.

(21) Appl. No.: 18/083,702

(22) Filed: Dec. 19, 2022

(65) Prior Publication Data

US 2023/0267859 A1 Aug. 24, 2023

(30) Foreign Application Priority Data

Feb. 21, 2022 (JP) ................................ 2022-024600

(51) Int. Cl.
*G09F 27/00* (2006.01)
*G06F 3/14* (2006.01)
*G08G 1/0962* (2006.01)
*G08G 1/123* (2006.01)
*G09F 9/35* (2006.01)
*G09F 21/04* (2006.01)

(52) U.S. Cl.
CPC ................ *G09F 27/00* (2013.01); *G06F 3/14* (2013.01); *G08G 1/0962* (2013.01); *G08G 1/123* (2013.01); *G09F 9/35* (2013.01); *G09F 21/048* (2013.01)

(58) Field of Classification Search
CPC .......... G09F 27/00; G09F 9/35; G09F 21/048; G06F 3/14; G06F 16/9538; G06F 16/9537; G08G 1/0962; G08G 1/123; G08G 1/00; G08G 1/005; G08G 1/09; G08G 1/127; G08G 1/16; G08G 1/133; G06Q 10/02; G06Q 50/26; G06Q 50/10; G06Q 50/40; G08B 3/10; G08B 5/22
See application file for complete search history.

(56) References Cited

U.S. PATENT DOCUMENTS

| 11,928,619 | B2 * | 3/2024 | Kojo | ......................... G08G 1/13 |
| 2019/0034967 | A1 * | 1/2019 | Ferguson | ........ B60W 60/00256 |
| 2020/0135026 | A1 | 4/2020 | Miyajima | |
| 2022/0270135 | A1 * | 8/2022 | Terzian | .............. G06Q 30/0265 |

FOREIGN PATENT DOCUMENTS

| JP | 2012-103823 A | | 5/2012 | |
| JP | 2020086141 A | * | 6/2020 | ......... B60K 23/0808 |
| KR | 10-2020-0009559 A | | 1/2020 | |
| KR | 102086154 B1 | | 4/2020 | |
| KR | 102200804 B1 | | 1/2021 | |
| WO | WO-2018037151 A1 | * | 3/2018 | ............. G08G 1/123 |
| WO | 2018/225320 A1 | | 12/2018 | |

* cited by examiner

*Primary Examiner* — Michael J Zanelli
(74) *Attorney, Agent, or Firm* — Oliff PLC

(57) ABSTRACT

An information processing apparatus includes a processor configured to generate a command for instructing a mobile display device configured to display information representing that a place where the mobile display device exists is a bus stop to output, at a point set as the bus stop, a notification indicating that a bus stops at the point a predetermined time before a time at which the bus stops.

20 Claims, 14 Drawing Sheets

| USER ID | BOARDING POINT | BOARDING DATE AND TIME | EXITING POINT | NUMBER OF PEOPLE |
|---|---|---|---|---|
| U001 | S02 | 10:00, FEB. 14, 2022 | S08 | 1 |
| U002 | S03 | 10:15, FEB. 14, 2022 | S18 | 1 |
| U003 | S05 | 10:25, FEB. 14, 2022 | S18 | 1 |
| U004 | S11 | 10:42, FEB. 14, 2022 | S11 | 1 |

FIG. 5

| BUS ID | CURRENT PLACE | ROUTE | STOPPING POINT | STOPPING DATE AND TIME | USER ID | NUMBER OF VACANT SEATS |
|---|---|---|---|---|---|---|
| V001 | X X X | X X X | S02 | 10:00, FEB. 14, 2022 | U001_ON | 3 |
| | | | S03 | 10:15, FEB. 14, 2022 | U002_ON | 2 |
| | | | S05 | 10:25, FEB. 14, 2022 | U003_ON | 1 |
| | | | S08 | 10:37, FEB. 14, 2022 | U001_OFF | 2 |
| | | | S11 | 10:42, FEB. 14, 2022 | U004_ON | 0 |
| | | | S18 | 10:48, FEB. 14, 2022 | U002_OFF U003_OFF U004_OFF | 4 |
| V002 | X X X | X X X | X X X | X X X | X X X | X X X |
| | | | X X X | X X X | X X X | X X X |
| | | | X X X | X X X | X X X | X X X |
| | | | X X X | X X X | X X X | X X X |
| V003 | X X X | X X X | X X X | X X X | X X X | X X X |
| ... | ... | ... | ... | ... | ... | ... |

FIG. 6

| MOBILE SIGN ID | CURRENT PLACE | ROUTE | STOPPING POINT | STOPPING DATE AND TIME | BUS ID |
|---|---|---|---|---|---|
| BS001 | X X X | X X X | X X X | X X X | V001 |
| | | | X X X | X X X | V002 |
| | | | X X X | X X X | V003 |
| | | | X X X | X X X | V004 |
| | | | ... | ... | ... |
| BS002 | X X X | X X X | X X X | X X X | X X X |
| | | | X X X | X X X | X X X |
| | | | X X X | X X X | X X X |
| | | | X X X | X X X | X X X |
| BS003 | X X X | X X X | X X X | X X X | X X X |
| ... | ... | ... | ... | ... | ... |

FIG. 8

BUS STOP
IN FRONT OF CITY HOSPITAL

BUS ARRIVES AT 10:00.
PLEASE DO NOT PARK AT THIS PLACE.

18

INFORMATION PROCESSING APPARATUS, INFORMATION PROCESSING METHOD, AND MOBILE OBJECT

CROSS-REFERENCE TO RELATED APPLICATION

This application claims priority to Japanese Patent Application No. 2022-024600 filed on Feb. 21, 2022, incorporated herein by reference in its entirety.

BACKGROUND

1. Technical Field

The present disclosure relates to an information processing apparatus, an information processing method, and a mobile object.

2. Description of Related Art

There is a technology for displaying a demand type bus stop on a user terminal (see, for example, WO 2018/225320).

SUMMARY

The present disclosure provides an information processing apparatus, an information processing method, and a mobile object that restrict another vehicle from stopping at a demand type bus stop.

An information processing apparatus according to a first aspect of the present disclosure includes a processor configured to generate a command for instructing a display device that is movable and is configured to display information representing that a place where the display device exists is a bus stop to output, at a point set as the bus stop, a notification indicating that a bus stops at the point a predetermined time before a time at which the bus stops at the point.

An information processing method according to a second aspect of the present disclosure is executed by a computer. The information processing method includes generating a command for instructing a display device that is movable and is configured to display information representing that a place where the display device exists is a bus stop to output, at a point set as the bus stop, a notification indicating that a bus stops at the point a predetermined time before a time at which the bus stops at the point.

A mobile object according to a third aspect of the present disclosure includes a processor configured to: autonomously move a mobile object to a point set as a bus stop; cause a display to display information representing that a place where the mobile object is present is the bus stop at the point set as the bus stop; and output, at the point set as the bus stop, a notification indicating that a bus stops at the point from a predetermined time before a time at which the bus stops at the point.

With each aspect of the present disclosure, it is possible to restrict another vehicle from stopping at a demand type bus stop.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram exemplifying a table configuration of a bus information DB;

FIG. 6 is a diagram exemplifying a table configuration of a mobile sign information DB;

FIG. 8 is a diagram illustrating an example of a screen for a notification indicating that this is a point at which a bus stops according to a first embodiment;

DETAILED DESCRIPTION OF EMBODIMENTS

Figure 1:
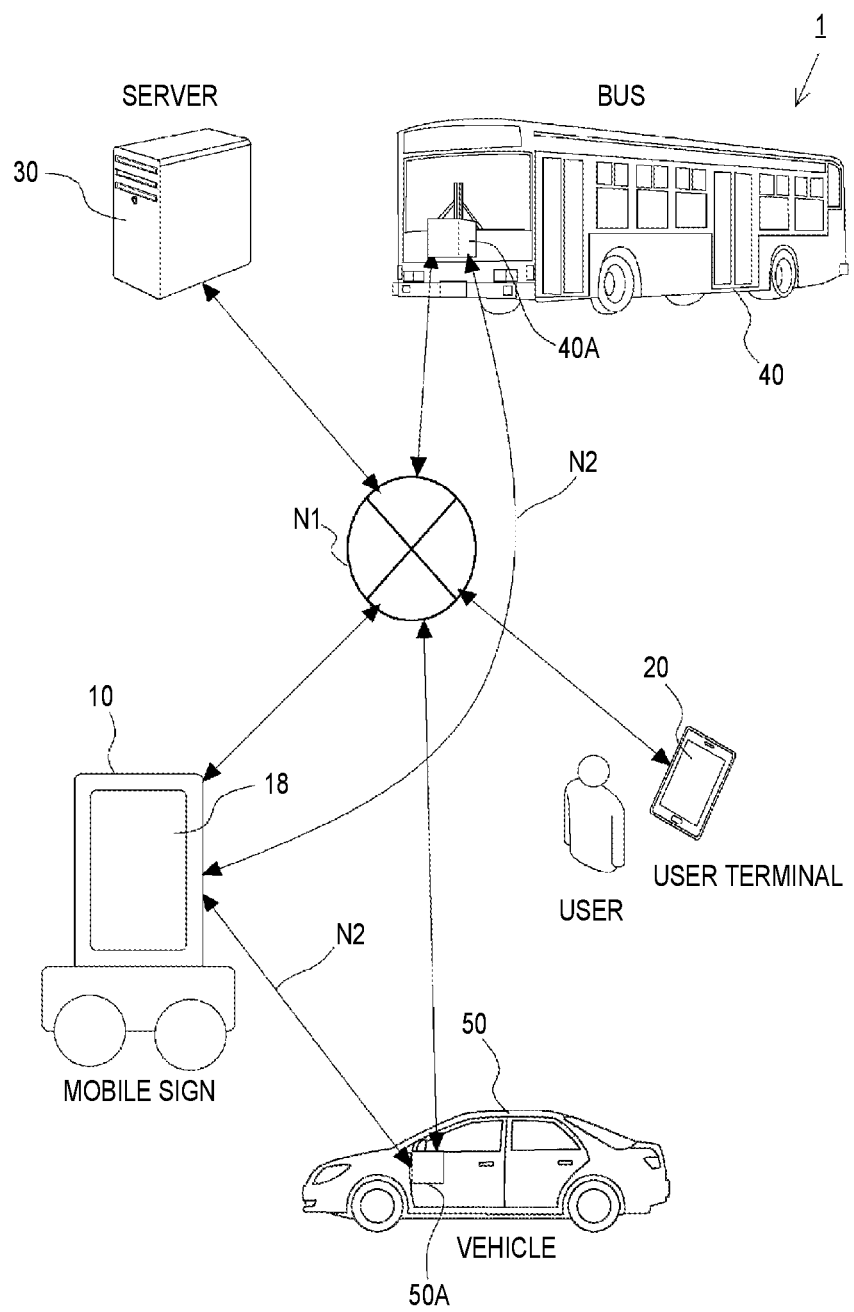
FIG. 1 is a diagram illustrating a schematic configuration of a system according to an embodiment.

An information processing apparatus that is one aspect of the present disclosure includes a control unit. The control unit generates a command such that a mobile display device that displays a fact that this place is a bus stop outputs, at the point set as the bus stop, a notification indicating that a bus stops at the point a predetermined time before a time at which the bus stops.

An example of the point set as the bus stop includes a point set as a bus stop in advance, a point desired by a user, or a point at which the bus can stop near the point desired by the user. An example of the point set as the bus stop in advance includes a point used as a bus stop only when a reservation is made in advance. The display device may be, for example, an autonomously traveling or autonomously flying mobile object. The display device may, for example, move according to an operation command received from the control unit.

Here, in a demand type bus, there is a case where there is no permanent sign at a bus stop, and a case where a point may not be noticed as a bus stop at first glance. For this reason, a user who uses the bus may not know where to wait. Therefore, it is conceivable to dispatch a mobile display device. By using the display device, it is possible to display a fact that this place is a bus stop at a point used as a bus stop.

Therefore, by causing the display device to arrive earlier than an arrival time of a bus, the user can recognize a stopping point of the bus.

However, in the case where there is no permanent sign at the bus stop, another vehicle may park at the bus stop. For example, since the bus stop is provided at a place in which a vehicle can park and stop relatively easily, the bus stop may also be provided at a place in which another vehicle can park and stop easily. For this reason, another vehicle may park at the bus stop when the bus arrives at the bus stop. In this case, the bus has to stop at a point away from the bus stop, and then the user using the bus may have to walk to move to the bus or an obstacle may be constituted to boarding or exiting the bus. Alternatively, when the bus stops at a place other than the bus stop, a traffic jam may occur.

Therefore, the control unit generates a command such that the display device outputs (sends) a notification indicating that the bus stops at the point set as the bus stop a predetermined time before the time at which the bus stops at the point set as the bus stop. By the command, the display device outputs, to its surroundings, the notification indicating that the bus stops at the point at which the bus stops. The notification can include a notification indicating that the place is a bus stop, a notification indicating a time at which the bus stops at the place, or a notification indicating a time remaining until the bus stops at the place. By the notification, a driver of another vehicle can recognize that the place is the bus stop, and thus he/she may refrain from parking and stopping at that point. Therefore, it is possible to restrict another vehicle from stopping at the bus stop when the bus arrives.

Hereinbelow, embodiments of the present disclosure will be described below with reference to the drawings. The configurations of the following embodiments are examples, and the present disclosure is not limited to the configurations of the embodiments. Further, the following embodiments can be combined as much as possible.

First Embodiment

FIG. 1 is a diagram illustrating a schematic configuration of a system 1 according to an embodiment. In the system 1, when a server 30 receives a use request for a bus 40 from a user terminal 20, the server 30 generates a route of the bus 40 and dispatches a mobile sign 10 to a stopping point of the bus 40 such that the user can use the bus 40. Therefore, it is a system where the mobile sign 10 outputs, to the surroundings, a notification indicating that the bus 40 stops at the stopping point of the bus 40. Hereinbelow, it is assumed that the stopping point of the bus 40 indicates a boarding point at which the user boards the bus 40 or an exiting point at which the user exits the bus 40.

The user can reserve the bus 40 by transmitting the use request to the server 30 via the user terminal 20. The use request is information for a user to use the bus 40. The use request includes information on the boarding point at which the user boards the bus 40, a boarding date and time at which the user boards the bus 40, and an exiting point at which the user exits the bus 40. By, for example, executing a predetermined application installed in the user terminal 20, the user can transmit the use request to the server 30.

The bus 40 is a vehicle in a demand type transportation that is operated according to a reservation of a user. The bus 40 may be, for example, a vehicle driven by a driver, but, as another method, may be a vehicle capable of autonomous driving. The bus 40 travels on a route that includes the boarding point and the exiting point of the user. The route may be changed depending on a boarding point and an exiting point of another user. Further, a position of the bus stop may be determined in advance. Then, depending on a reservation, a bus stop that can be passed through may be selected. Further, the position of the bus stop can also be arbitrarily determined. The position of the bus stop and the route of the bus 40 may be decided by, for example, the server 30. The bus 40 is not limited to a large vehicle, and may be, for example, a small passenger car.

The mobile sign 10 has a configuration of, for example, a battery electric vehicle, and travels by operating a motor with power accumulated in a battery. Further, the mobile sign 10 can autonomously travel. The mobile sign 10 includes, for example, a display 18. By displaying a screen for showing that this is a bus stop on the display 18, it is possible to inform the user of a position of the bus stop or to output a notification such that the surrounding vehicle does not stop. The mobile sign 10 is an example of a mobile display device. The server 30 generates a command for moving the mobile sign 10 based on a stopping point and a stopping time of the bus 40. The server 30 manages an operation of the mobile sign 10 such that, for example, the mobile sign 10 arrives at the point at which the user boards the bus 40 a predetermined time before a time reserved by the user.

The server 30 is a device that manages the mobile sign 10 and the bus 40. Upon receiving the use request for the bus 40 from the user terminal 20, the server 30 decides the mobile sign 10 and the bus 40 to be dispatched to the boarding point of the user, generates the operation command for the mobile sign 10 and the bus 40, and transmits the operation command to the mobile sign 10 and the bus 40.

Further, the server 30 instructs the mobile sign 10 to output, at the stopping point of the bus 40, a notification indicating that this place is the stopping position of the bus 40 such that the notification is delivered to, for example, a driver of a surrounding vehicle 50. The mobile sign 10 outputs the notification indicating that the bus 40 stops by, for example, displaying, on the display 18, a fact that this is the place at which the bus 40 stops and this is the time at which the bus 40 stops. For example, the driver of the vehicle 50 who sees it does not park at the place. Therefore, the bus 40 can stop at the bus stop. A method of outputting the notification to the surroundings is not limited to displaying on the display 18, and includes, for example, emitting sound (including voice) or delivering information to the surrounding vehicle 50, via communication.

The mobile sign 10, the user terminal 20, the server 30, and the bus 40 are connected to each other by a network N1. The network N1 may be, for example, a worldwide public communication network, such as the Internet, and may employ a wide area network (WAN) or other communication networks. Further, the network N1 may include a telecommunication network for a mobile phone or the like, or a wireless communication network, such as Wi-Fi®. Further, the mobile sign 10 is connected to the bus 40 and the surrounding vehicle 50 via, for example, a network N2. The network N2 executes data communication using, for example, vehicle-to-vehicle communication (V2V communication), Bluetooth® Low Energy, Near Field Communication (NFC), Ultra Wide Band (UWB), and Wi-Fi®. The surrounding vehicle 50 may be connected to the network N1.

Figure 2:
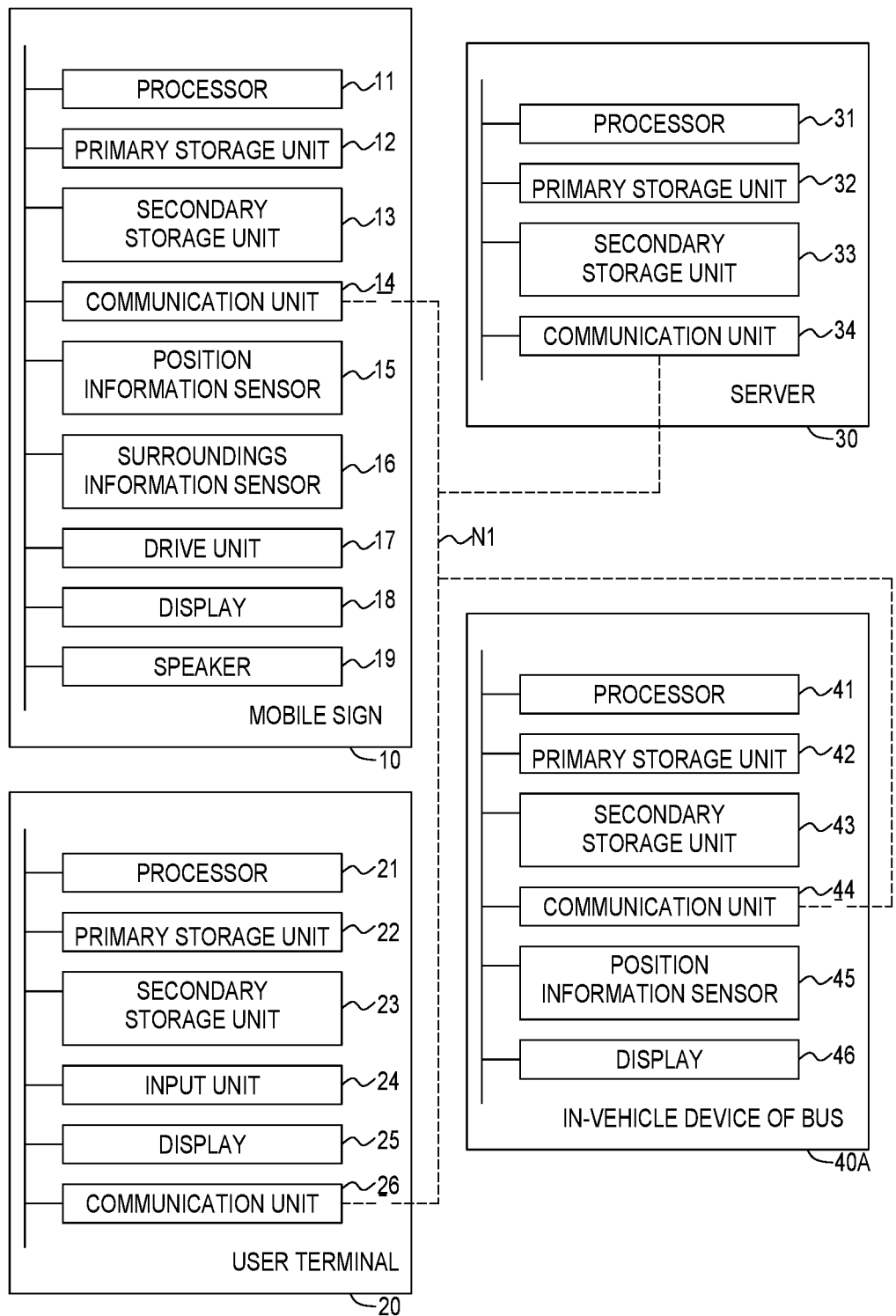
FIG. 2 is a block diagram schematically illustrating an example of each configuration of a mobile sign, a user terminal, a server, and a bus that constitute the system according to the embodiment.

With reference to FIG. 2, hardware configurations of the mobile sign 10, the user terminal 20, the server 30, and an in-vehicle device 40A of the bus 40 will be described. FIG. 2 is a block diagram schematically illustrating an example of a configuration of each of the mobile sign 10, the user terminal 20, the server 30, and the bus 40 that constitute the system 1 according to the present embodiment.

The server 30 has a computer configuration. The server 30 includes a processor 31, a primary storage unit 32, a secondary storage unit 33, and a communication unit 34. These are connected to each other by buses. The processor 31 is an example of the control unit.

The processor 31 may be, for example, a central processing unit (CPU) or a digital signal processor (DSP). The processor 31 controls the server 30 and executes arithmetic of various information processes. An example of the primary storage unit 32 includes a random access memory (RAM) or a read-only memory (ROM). An example of the secondary storage unit 33 includes an erasable programmable ROM (EPROM), a hard disk drive (HDD), or a removable media. The secondary storage unit 33 stores, for example, an operating system (OS), various programs, and various tables. The processor 31 loads a program stored in the secondary storage unit 33 into a work area of the primary storage unit 32 and executes it, and through the execution of the program, each component or the like is controlled. As such, the server 30 realizes a function that meets a predetermined purpose. The primary storage unit 32 and the secondary storage unit 33 are computer-readable recording media. The server 30 may be a single computer, or may be a combination of a plurality of computers. Further, information stored in the secondary storage unit 33 may be stored in the primary storage unit 32. Alternatively, information stored in the primary storage unit 32 may be stored in the secondary storage unit 33.

The communication unit 34 communicates with the mobile sign 10, the user terminal 20, and the bus 40 by way of the network N1. The communication unit 34 may be, for example, a local area network (LAN) interface board, or a wireless communication circuit for wireless communication. The LAN interface board or the wireless communication circuit is connected to the network N1.

Next, the mobile sign 10 may be, for example, a mobile object that can autonomously travel, and has a computer configuration. The mobile sign 10 includes a processor 11, a primary storage unit 12, a secondary storage unit 13, a communication unit 14, a position information sensor 15, an environment information sensor 16, a drive unit 17, the display 18, and a speaker 19. These are connected to each other by buses. Since the processor 11, the primary storage unit 12, and the secondary storage unit 13 are the same as the processor 31, the primary storage unit 32, and the secondary storage unit 33 of the server 30, description thereof will be omitted.

The communication unit 14 connects the mobile sign 10 to the network N1 or the network N2. The communication unit 14 is a circuit used for communicating with other devices (for example, the server 30, the bus 40, or the vehicle 50) by way of the network N1 or the network N2, using a wireless communication network, such as a mobile communication service (for example, a telecommunication network, such as Fifth Generation (5G), Fourth Generation (4G), Third Generation (3G), and Long Term Evolution (LTE)), the V2V communication network, Wi-Fi®, Bluetooth® Low Energy, NFC, and UWB.

The position information sensor 15 acquires position information (for example, the latitude and the longitude) of the mobile sign 10 at a predetermined cycle. An example of the position information sensor 15 includes a Global Positioning System (GPS) reception unit, or a wireless communication unit. Information acquired by the position information sensor 15 is recorded in, for example, the secondary storage unit 13 and transmitted to the server 30.

The environment information sensor 16 senses a state of the mobile sign 10 or senses surroundings of the mobile sign 10. As a sensor used for sensing the state of the mobile sign 10, a gyro sensor, an acceleration sensor, or an azimuth angle sensor may be used. As a sensor used for sensing the surroundings of the mobile sign 10, for example, a stereo camera, a laser scanner, LIDAR, or a radar may be used.

The drive unit 17 is a device used for causing the mobile sign 10 to travel based on a control command generated by the processor 11. The drive unit 17 includes, for example, a plurality of motors used for driving wheels included in the mobile sign 10, and autonomous traveling of the mobile sign 10 is realized when the motors are operated according to the control commands.

The display 18 offers information to a user, and an example thereof includes a liquid crystal display (LCD) or an electroluminescence (EL) panel. Further, the speaker 19 outputs, for example, voice or a warning sound.

Next, the user terminal 20 will be described. An example of the user terminal 20 includes a small computer, such as a smart phone, a mobile phone, a tablet terminal, a personal information terminal, a wearable computer (for example, a smart watch), or a personal computer (PC). The user terminal 20 includes a processor 21, a primary storage unit 22, a secondary storage unit 23, an input unit 24, a display 25, and a communication unit 26. These are connected to each other by buses. Since the processor 21, the primary storage unit 22, and the secondary storage unit 23 are the same as the processor 31, the primary storage unit 32, and the secondary storage unit 33 of the server 30, description thereof will be omitted.

The input unit 24 receives an input operation executed by the user, and may be, for example, a touch panel, a mouse, a keyboard, or a push button. The display 25 offers information to the user, and an example thereof includes an LCD or an EL panel. The input unit 24 and the display 25 may be configured as one touch panel display.

Further, the communication unit 26 connects to the network N1, and is a circuit used for communicating with other devices (for example, the server 30) by way of the network N1, using a wireless communication network, such as a mobile communication service (for example, a telecommunication network, such as 5G, 4G, 3G, and LTE), Wi-Fi®, Bluetooth® Low Energy, NFC, and UWB.

Next, the bus 40 includes the in-vehicle device 40A. The in-vehicle device 40A has a computer configuration. The in-vehicle device 40A of the bus 40 includes a processor 41, a primary storage unit 42, a secondary storage unit 43, a communication unit 44, a position information sensor 45, and a display 46. These are connected to each other by buses. Since the processor 41, the primary storage unit 42, and the secondary storage unit 43 are the same as the processor 31, the primary storage unit 32, and the secondary storage unit 33 of the server 30, description thereof will be omitted. Further, since the communication unit 44 and the position information sensor 45 are the same as the communication unit 14 and the position information sensor 15 of the mobile sign 10, description thereof will be omitted. Further, since the display 46 is the same as the display 25 of the user terminal 20, description thereof will be omitted. The bus 40 may be, for example, a mobile object that can autonomously travel. In this case, in the same manner as in the mobile sign 10, the processor 41 controls the bus 40 based on a command from the server 30.

Figures 3, 4:
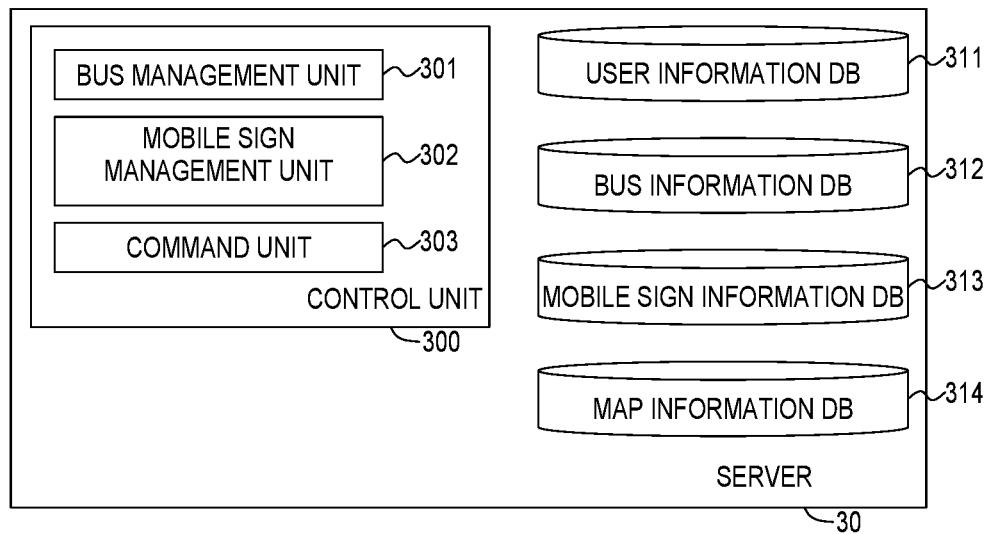
FIG. 3 is a diagram exemplifying a functional configuration of a server.
FIG. 4 is a diagram exemplifying a table configuration of a user information DB.

Next, a function of the server 30 will be described. FIG. 3 is a diagram exemplifying a functional configuration of the server 30. As functional components, the server 30 includes a control unit 300, a user information DB 311, a bus information DB 312, a mobile sign information DB 313, and a map information DB 314. The processor 31 of the server 30 executes processing of the control unit 300 according to a computer program on the primary storage unit 32. However, any one of each functional component or part of the processing may be executed by a hardware circuit. The control unit 300 includes a bus management unit 301, a mobile sign management unit 302, and a command unit 303.

The user information DB 311, the bus information DB 312, the mobile sign information DB 313, and the map information DB 314 are constructed when a program of a database management system (DBMS) executed by the processor 31 manages data stored in the secondary storage unit 33. The user information DB 311, the bus information DB 312, the mobile sign information DB 313, and the map information DB 314 may be, for example, relational databases.

Any one of each functional component of the server 30 or part of its processing may be executed by another computer connected to the network N1.

The bus management unit 301 collects information on the bus 40 and updates the bus information DB 312 described below. Specifically, the bus management unit 301 periodically communicates with a plurality of buses 40 and collects information on current positions of the buses 40. The collected information is reflected in the bus information DB 312 described below.

Further, the bus management unit 301 acquires the use request from a user who desires to use the bus 40. The use request is information transmitted from the user terminal 20 to the server 30. The use request includes information on, for example, a user ID, a boarding point, a boarding date and time, and an exiting point. Further, the use request may include information on the number of people using the bus 40. The user ID is an identifier unique to the user. User information (for example, a name, an address, a telephone number, or an e-mail address) corresponding to the user ID may be registered in advance by the user using the user terminal 20, or may be transmitted from the user terminal 20, together with the use request. The user information is stored in the secondary storage unit 33 in association with the user ID. Further, the user information DB 311 stores information on, for example, the boarding point, the boarding date and time, and the exiting point that are included in the use request.

Here, FIG. 4 is a diagram exemplifying a table configuration of the user information DB 311. The user information DB 311 has fields of the user ID, the boarding point, the boarding date and time, the exiting point, and the number of people. Information (the user ID) with which the user can be identified is entered in a user ID field. Information on the boarding point included in the use request is stored in a boarding point field. The boarding point is a point at which the user desires to board the bus 40, and is indicated by, for example, coordinates (the latitude and the longitude), an address, a building name, or a name or a number of a bus stop.

Information on the boarding date and time included in the use request is stored in a boarding date and time field. The boarding date and time is a date and time at which the user desires to board the bus 40. The boarding date and time may be designated as a time range with a certain width. Information on the exiting point included in the use request is stored in an exiting point field. The exiting point is a point at which the user desires to exit the bus 40, and is indicated by, for example, coordinates (the latitude and the longitude), an address, a building name, or a name or a number of a bus stop. The boarding point or the exiting point may be a point registered in advance in the secondary storage unit 33 of the server 30 as a point at which the bus 40 can stop. Information on the number of people included in the use request is stored in a people number point field. The number of people is the number of people who desire to board the bus 40.

Upon receiving the use request from the user terminal 20, the command unit 303 selects a dispatchable bus 40 based on the information, such as the boarding point, the boarding date and time, and the exiting point that are included in the use request. The dispatchable bus 40 is a bus 40 that has a sufficient number of vacant seats for the number of people, is movable to the boarding point on the boarding date and time, and is movable to the exiting point thereafter. For example, a bus 40 that has a reservation for boarding or exiting at another point on the same date and time does not correspond to the bus 40 movable to the boarding point on the boarding date and time. Therefore, the bus 40 may be selected according to a route of the bus 40 at a current point.

When the dispatchable bus 40 is selected, the command unit 303 generates an operation command that is a command for operating the bus 40. The operation command includes, for example, the route of the bus 40. The command unit 303 generates the route based on map information stored in the map information DB 314. The command unit 303 generates the operation command such that, for example, the bus 40 departs from a current place and travels by way of each dispatching point on a dispatching date and time.

The map information DB 314 stores, as the map information, for example, link data on a road (a link), node data on a node point, intersection data on each intersection, search data for searching for a route, facility data on a facility, and search data for searching for a point. Further, the map information DB 314 may store information on a point at which the bus 40 and the mobile sign 10 can stop.

Upon generating the operation command for the bus 40, the command unit 303 updates the bus information DB 312. Here, a configuration of bus information stored in the bus information DB 312 will be described with reference to FIG. 5. FIG. 5 is a diagram exemplifying a table configuration of the bus information DB 312. The bus information table has fields for a bus ID, a current place, a route, a stopping point, a stopping date and time, the user ID, and a vacant seat. Information (the bus ID) with which the bus 40 can be identified is entered in a bus ID field. The bus ID is given to each bus 40 by, for example, the bus management unit 301. Information (position information) on the current place of the bus 40 is entered in a current place field. The current place of the bus 40 is detected by the position information sensor 45 of the bus 40 and transmitted to the server 30. The current place field is updated each time the position information is received from the bus 40.

Information on the route of the bus 40 is entered in a route field. Information on a point at which the bus 40 stops is entered in a stopping point field. Information on a point that can become a destination of the bus 40, such as coordinates, an address, or a building name, is entered in the stopping point field. The point at which the bus 40 stops is a point at which the user boards or exits, and is entered based on the information on the boarding point or the exiting point included in the use request of any user. A column of the stopping point is arranged in an order in which the bus 40 stops. Information on a stopping date and time of the bus 40 corresponding to the stopping point is entered in a stopping date and time field. A date and time at which the user exits at the exiting point may be calculated based on the boarding time and a time required for the bus 40 to move from the boarding point to the exiting point. Since a time required for the bus 40 to move can be calculated from past data or a past traveling distance, a date and time at which the bus 40 arrives at the exiting point may be calculated based on this time.

An identification code (the user ID) unique to the user is entered in a user ID field. Further, after the user ID, a character string corresponding to boarding or exiting is added. When the user boards at the corresponding stopping point, an ON character string is added after the user ID, and when the user exits at the corresponding stopping point, an OFF character string is added after the user ID. The number of vacant seats in the bus 40 when it departs from a corresponding stopping point is stored in the vacant seat field.

Further, after selecting the bus 40 corresponding to the boarding point and the exiting point of the user, the command unit 303 further selects the mobile sign 10 corresponding to the boarding point and the exiting point of the user. Different mobile signs 10 may be selected at the boarding point and the exiting point, or the same mobile sign 10 may be selected. For example, one mobile sign 10 may be allocated to one bus 40. In this case, the mobile sign 10 may move ahead of the bus 40 on the same route as the bus 40. However, the mobile sign 10 is caused to arrive at the bus stop earlier than the bus 40 by a predetermined time. Therefore, the command unit 303 generates the operation command for the mobile sign 10 such that the mobile sign 10 arrives at the stopping point of the bus 40 a predetermined time before the arrival of the bus 40. The operation command includes, for example, the route, each stopping position, an arrival time at each stopping position, and a departure time from each stopping position. The generated operation command is transmitted to the corresponding mobile sign 10.

Further, one mobile sign 10 may correspond to a plurality of buses 40. In this case, the mobile sign 10 does not have to correspond to all stopping positions of one bus 40, but may correspond to a part of the stopping positions. For example, one or more mobile signs 10 may be operated such that the one or more mobile signs 10 are allocated to a predetermined area and correspond to buses 40 that stop within the predetermined area. In this case, the command unit 303 selects a mobile sign 10 that can arrive at the stopping position of the bus 40 within the predetermined area a predetermined time before the arrival of the bus 40, and generates the operation command including the route of the mobile sign 10. The generated operation command is transmitted to the corresponding mobile sign 10.

Upon generating the operation command for the mobile sign 10, the command unit 303 updates the mobile sign information DB 313. Here, a configuration of mobile sign information stored in the mobile sign information DB 313 will be described with reference to FIG. 6. FIG. 6 is a diagram exemplifying a table configuration of the mobile sign information DB 313. The mobile sign information table has fields for a mobile sign ID, a current place, a route, a stopping point, a stopping date and time, and the user ID. Information (the mobile sign ID) with which the mobile sign 10 can be identified is entered in a mobile sign ID field. The mobile sign ID is given to each mobile sign 10 by, for example, the mobile sign management unit 302. Information (position information) on the current place of the mobile sign 10 is entered in a current place field. The current place of the mobile sign 10 is detected by the position information sensor 15 of the mobile sign 10 and transmitted to the server 30.

Information on the route of the mobile sign 10 is entered in a route field. Information on a point at which the mobile sign 10 stops is entered in a stopping point field. Information on a point that can become a destination of the mobile sign 10, such as coordinates, an address, or a building name, is entered in the stopping point field. The point at which the mobile sign 10 stops is the point at which the user boards or exits, and is the same as the stopping point of the corresponding bus 40. A column of the stopping point is arranged in an order in which the mobile sign 10 stops. Information on a stopping date and time of the mobile sign 10 corresponding to the stopping point is entered in a stopping date and time field. Information on a date and time of departure from the bus stop may also be entered therein. The bus ID corresponding to the stopping point is entered in the bus ID field.

Further, when the mobile sign 10 arrives at the stopping position of the bus 40, the command unit 303 generates the command for instructing the mobile sign 10 to output, to the surroundings of the mobile sign 10, the notification indicating that the bus 40 stops at the stopping position of the bus 40 thereafter and sends the command to the mobile sign 10. The command unit 303 generates, for example, the command for the display 18 of the mobile sign 10 to output the information on the stopping position of the bus 40. As the information on the stopping position of the bus 40, for example, information indicating that the point where the mobile sign 10 exists is the point at which the bus 40 stops and information indicating the time at which the bus 40 stops at the point where the mobile sign 10 exists are displayed on the display 18. The outputting of the notification is started a predetermined time before a scheduled arrival time of the bus 40 at the stopping point of the bus 40. Then, the command is generated such that the notification is continuously output by the time at which the bus 40 arrives or by a time at which the mobile sign 10 departs.

Further, instead of or together with displaying a screen for the notification indicating that this is the stopping point of the bus 40 on the display 18, the command unit 303 may output the sound notification indicating the point at which the bus 40 stops and the time at which the bus 40 arrives from the speaker 19. For example, the command unit 303 may generate a command such that voice, such as "The bus stops at this place at 10 o'clock." or "The bus arrives in 5 minutes." is played from the speaker 19.

Figure 7:
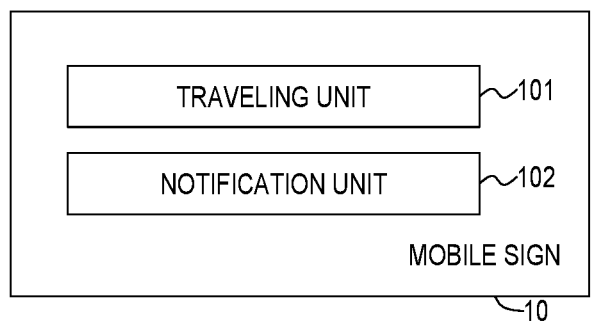
FIG. 7 is a diagram illustrating a functional configuration of a mobile sign.

Next, a function of the mobile sign 10 will be described. FIG. 7 is a diagram illustrating a functional configuration of the mobile sign 10. As functional components, the mobile sign 10 includes a traveling unit 101 and a notification unit 102. The processor 11 of the mobile sign 10 executes processing of the traveling unit 101 and the notification unit 102 according to a computer program on the primary storage unit 12. However, any one of each functional component or part of the processing may be executed by a hardware circuit. Any one of each functional component of the mobile sign 10 or part of its processing may be executed by another computer connected to the network N1.

The traveling unit 101 controls traveling of the mobile sign 10 at a time of autonomous traveling of the mobile sign 10. The traveling unit 101 generates a control command for controlling the drive unit 17 using the data detected by the environment information sensor 16. For example, the traveling unit 101 controls the rotation speed of a plurality of motors to control speed of the mobile sign 10 or controls a steering angle.

The traveling unit 101 generates a traveling path of the mobile sign 10 based on, for example, the data detected by the environment information sensor 16 and controls the drive unit 17 such that the mobile sign 10 travels according to the traveling path. As a method of causing the mobile sign 10 to autonomously travel, a known method can be employed. At the time of the autonomous traveling, the traveling unit 101 may execute a feedback control based on a detection value of the environment information sensor 16. The traveling unit 101 autonomously travels so as to go around a predetermined route. The route is included in the operation command transmitted from the server 30. For example, the traveling unit 101 causes the mobile sign 10 to travel based on the traveling route and the stopping position that are included in the operation command received from the server 30. The operation command received from the server 30 is stored in, for example, the secondary storage unit 13 by the traveling unit 101.

Further, the traveling unit 101 periodically transmits the information on the mobile sign 10 to the server 30. The traveling unit 101 transmits, to the server 30, as the information on the mobile sign 10, for example, information on the current place acquired by the position information sensor 15, a remaining battery capacity, and the like.

Next, the notification unit 102 executes notification processing that is processing of outputting, to a surrounding person or a surrounding vehicle 50, for example, the notification indicating that this is the stopping point of the bus 40 at the stopping point of the bus 40. When both a condition on the position of the mobile sign 10 and a condition on the time are satisfied, the notification unit 102 executes the notification processing. The notification unit 102 compares the position information detected by the position information sensor 15 with the stopping point included in the operation command transmitted from the server 30, and, when the current position of the mobile sign 10 is a predetermined distance from the stopping point of the bus 40, it determines that the condition on the position is satisfied. Further, the notification unit 102 compares the current time with the time at which the bus 40 stops at the stopping point received from the server 30, and, when the current time is within a predetermined time before the time at which the bus 40 stops at the stopping point, it determines that the condition on the time is satisfied.

Upon determining that both the conditions on the time and the position are satisfied, the notification unit 102 displays, for example, a screen illustrated in FIG. 8 on the display 18. FIG. 8 is a diagram illustrating an example of the screen for a notification indicating a point at which the bus 40 stops according to the first embodiment. The information indicating that the point where the mobile sign 10 exists is the point at which the bus 40 stops and the information indicating the time at which the bus 40 stops at the point where the mobile sign 10 exists are displayed on the display 18. In FIG. 8, by displaying "The bus arrives at 10 o'clock.", information that the point is the stopping point of the bus 40 and information that the time at which the bus 40 arrives is 10:00 are provided. Further, words or a name of the bus stop, such as "bus stop" or "in front of city hospital", are displayed on the display 18. As such, the user using the bus 40 can recognize the place of the bus stop.

Display of the screen illustrated in FIG. 8 is started a predetermined time before the scheduled arrival time of the bus 40 at the point at which the bus 40 stops. The scheduled arrival time of the bus 40 corresponds to the stopping date and time stored in the bus information DB 312. Then, the display of the screen illustrated in FIG. 8 is continued by the time at which the bus 40 arrives or until the time at which the mobile sign 10 departs.

Further, instead of or together with displaying the screen illustrated in FIG. 8 on the display 18, the command unit 303 may output the sound notification indicating the point at which the bus 40 stops and the time at which the bus 40 arrives from the speaker 19. For example, voice, such as "The bus stops at 10 o'clock." or "The bus arrives in 5 minutes.", may be played by the speaker 19.

When, for example, the time at which the bus 40 stops has passed, the notification unit 102 may end the notification. Alternatively, as another method, upon receiving a notification from the server 30 or the bus 40 that the bus 40 has arrived at the stopping point, the notification unit 102 may end the notification. In this case, the communication unit 44 of the bus 40 and the communication unit 14 of the mobile sign 10 may communicate via the network N2. As such, the notification unit 102 may output the notification indicating that this is the stopping point of the bus 40 by the time at which the bus 40 actually arrives. When the bus 40 arrives later than the scheduled stopping time, after the scheduled stopping time, the notification unit 102 may output the notification indicating that this is the stopping position of the bus 40 without the notification indicating the stopping time of the bus 40.

Then, when the bus 40 arrives, the traveling unit 101 moves the mobile sign 10 toward a next destination.

Figure 9:
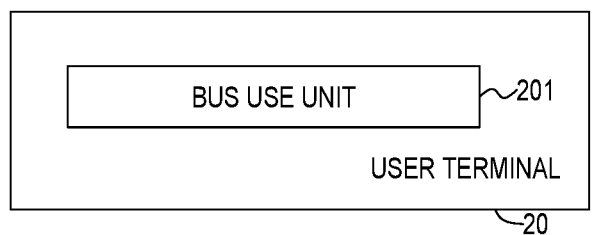
FIG. 9 is a diagram illustrating a functional configuration of a user terminal.

Next, a function of the user terminal 20 will be described. FIG. 9 is a diagram illustrating a functional configuration of the user terminal 20. As a functional component, the user terminal 20 includes a bus use unit 201. The processor 21 of the user terminal 20 executes processing of the bus use unit 201 according to a computer program on the primary storage unit 22. However, part of the processing of the bus use unit 201 may be executed by a hardware circuit. Part of the processing of the bus use unit 201 may be executed by another computer connected to the network N1.

The bus use unit 201 has a function of accessing the server 30 and interacting with the server 30. The function may be realized by a web browser operating on the user terminal 20 or dedicated application software. In the first embodiment, the bus use unit 201 is configured to be able to execute application software used for having a dialog with the server 30. The bus use unit 201 generates the use request according to an input to the input unit 24 of the user terminal 20.

For example, the bus use unit 201 requires that a boarding point (hereinafter, also referred to as a desired boarding point) desired by the user, a boarding date and time (hereinafter, also referred to as a desired boarding date and time) desired by the user, an exiting point (hereinafter, also referred to as a desired exiting point) desired by the user, and the number of people be input. At this time, the current position of the user terminal 20 may be set as the desired boarding point and the current date and time may be set as the desired boarding date and time. When the bus use unit 201 transmits, to the server 30, information on the desired boarding point, the desired boarding date and time, and the desired exiting point, the server 30 selects, as candidates for the stopping positions of the bus 40, points at which the bus 40 can stop on the surroundings of the desired boarding point and the surroundings of the desired exiting point at the desired boarding date and time, and transmits the position to the user terminal 20. At this time, the bus use unit 201 may transmit only a stopping point corresponding to a bus 40 that can be reserved. Then, the bus use unit 201 displays a map on the display 25 and displays points at which the bus 40 can stop on the map. When there is a plurality of points at which the bus 40 can stop, the bus use unit 201 displays the plurality of points. By tapping a point at which the bus 40 can stop displayed on the display 25, the user selects the boarding point and the exiting point.

When the boarding point and the exiting point are selected, the bus use unit 201 generates the use request including the user ID, the boarding point, the boarding date and time, the exiting point, and the number of people, and transmits it to the server 30. Thereafter, for example, when information indicating that the reservation is completed is transmitted from the server 30, the bus use unit 201 displays, on the display 25, a screen for showing that the reservation is completed. The reservation method is not limited thereto, and other methods can also be employed.

Figure 10:
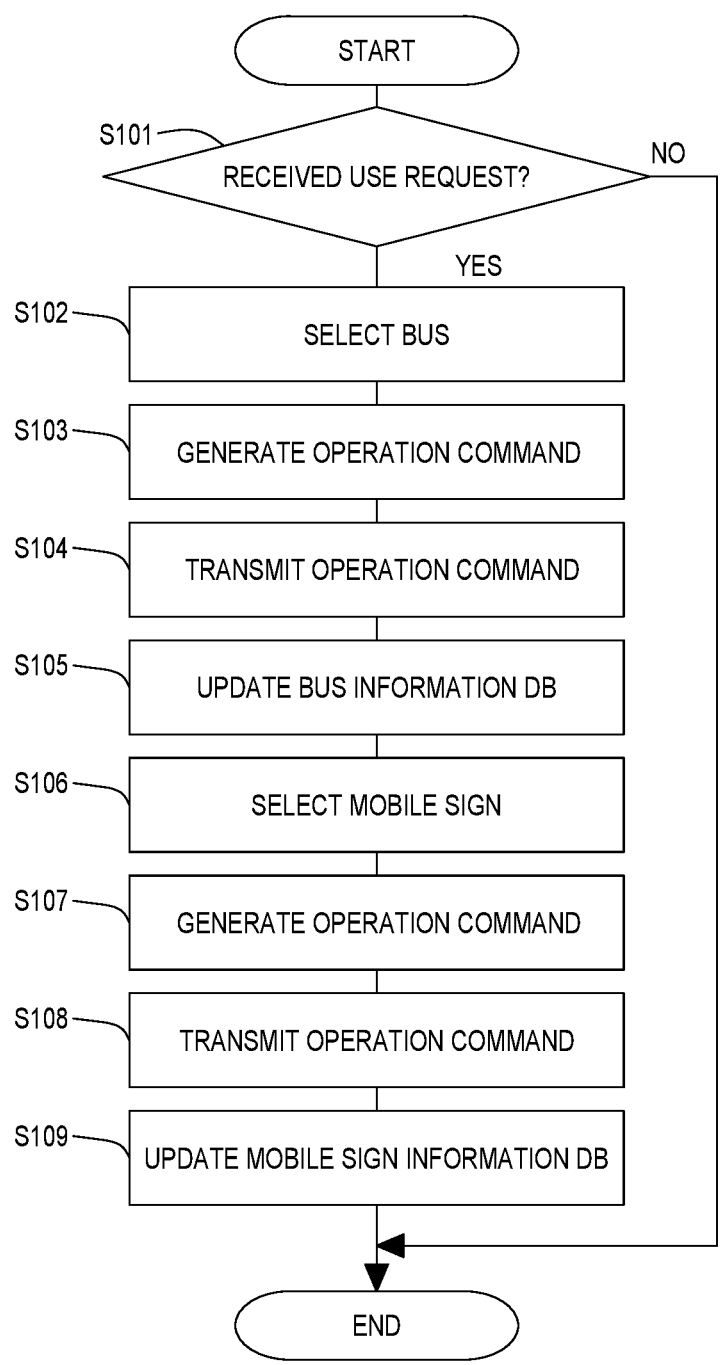
FIG. 10 is a flowchart of processing for generating operation commands for a mobile sign and a bus in the server according to the first embodiment.

Next, processing of generating the operation commands for the mobile sign 10 and the bus 40 in the server 30 will be described. FIG. 10 is a flowchart of the processing for generating the operation commands for the mobile sign 10 and the bus 40 in the server 30 according to the present embodiment. The processing illustrated in FIG. 10 is executed in the server 30 at predetermined time intervals.

In step S101, the bus management unit 301 determines whether it has received the use request from the user terminal 20. When a positive determination is made in step S101, the process proceeds to step S102, and when a negative determination is made, this routine ends. In step S102, the bus management unit 301 selects the bus 40 to be boarded by the user. The bus management unit 301 selects the bus 40 based on the information included in the use request and the bus information stored in the bus information DB 312. Specifically, the bus management unit 301 selects the bus 40 that can move to the boarding point and then move to the exiting point on the boarding date and time, and the bus 40 that has a sufficient number of vacant seats for the number of people. After selecting the bus 40, the bus management unit 301 may transmit a notification indicating that the reservation of the bus 40 is completed to the user terminal 20.

In step S103, the command unit 303 generates the operation command such that the bus 40 departs from the current place and travels by way of the boarding point and the exiting point on the boarding date and time. As such, the command unit 303 sets the bus stop based on the information on the boarding point and the exiting point received from the user terminal 20. At this time, the command unit 303 may generate the route of the bus 40 and include the route of the bus 40 in the operation command. For example, the operation command may be a command for displaying, on the display 46 of the bus 40, a screen for guiding the user to the route of the bus 40.

Then, in step S104, the command unit 303 transmits the operation command to the bus 40. Further, in step S105, the command unit 303 updates the bus information DB 312. The command unit 303 enters a new route in the route field of the corresponding bus 40 and updates each field for the stopping point, the stopping date and time, the user ID, and the vacant seat. At this time, as necessary, the command unit 303 changes a record such that the stopping points are arranged in the order of stops on the route of the bus 40.

In step S106, the command unit 303 selects the mobile sign 10 to be dispatched to the stopping point of the bus 40. The command unit 303 selects the mobile sign 10 based on, for example, the bus information stored in the bus information DB 312. Specifically, the command unit 303 selects the mobile sign 10 that can move to a newly added boarding point or exiting point. Different mobile signs 10 may be selected for the boarding point and the exiting point. The command unit 303 selects, for example, the mobile sign 10 that can arrive at the newly added boarding point a predetermined time before the boarding date and time. At this time, the command unit 303 selects the mobile sign 10 based on the route, the stopping point, and the stopping date and time that are stored in the mobile sign information DB 313. For example, the command unit 303 may select the mobile sign 10 on the condition that the newly added boarding point exists within a predetermined distance from the route of the mobile sign 10 at the current time. The predetermined distance may be decided based on, for example, cost. The same applies to the exiting point. When one mobile sign 10 is allocated to each bus 40, the mobile sign 10 that is already allocated is selected.

The command unit 303 may generate the routes of the mobile signs 10 again such that, for example, the total traveling distance of the mobile signs 10 becomes shortest. In other words, when a new stopping point of the bus 40 is added, it is also conceivable that the traveling distance as a whole becomes shorter when the routes of the mobile signs 10 are changed than when the route of one mobile sign 10 is changed. In this case, the routes of the mobile signs 10 may be changed.

In step S107, the command unit 303 generates the operation command such that the mobile sign 10 departs from the current place, arrives at the stopping point a predetermined time before the stopping date and time of the bus 40, and executes the notification processing. The operation command includes the route of the mobile sign 10. When the route of the mobile sign 10 is changed, the command unit 303 generates the operation command corresponding to each mobile sign 10.

Then, in step S108, the command unit 303 transmits the operation command to the mobile sign 10. Further, in step S109, the command unit 303 updates the mobile sign information DB 313. In other words, the command unit 303 enters a new route in the route field of the corresponding mobile sign 10 and updates each field for the stopping point, the stopping date and time, and the bus ID. At this time, as necessary, the command unit 303 changes a record such that the stopping points are arranged in the order of stops on the route of the mobile sign 10.

Figure 11:
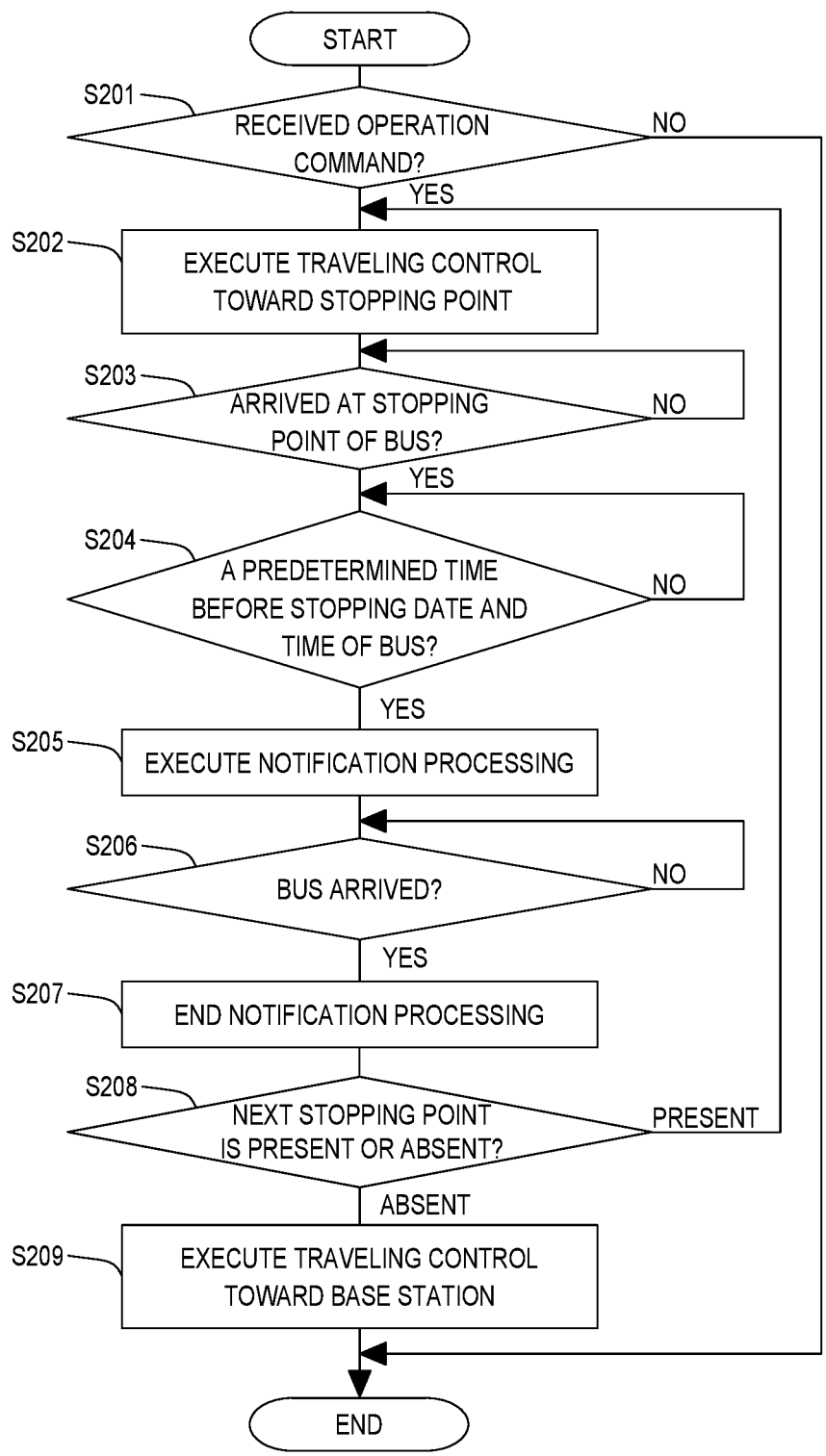
FIG. 11 is a flowchart of processing at a time of the operation of the mobile sign according to the first embodiment.

Next, processing of the mobile sign 10 will be described. FIG. 11 is a flowchart of processing at a time of the operation of the mobile sign 10 according to the present embodiment. The processing illustrated in FIG. 11 is executed in the mobile sign 10 at predetermined time intervals.

In step S201, the traveling unit 101 determines whether it has received the operation command. When a positive determination is made in step S201, the process proceeds to step S202, and when a negative determination is made, this routine ends. In step S202, the traveling unit 101 executes a traveling control toward the stopping point of the bus 40. For example, the traveling unit 101 specifies the stopping point of the bus 40 that is a next waypoint based on the current position of the mobile sign 10 and the route included in the operation command, and controls the drive unit 17 such that the mobile sign 10 moves to the stopping point. Further, the traveling unit 101 controls the drive unit 17 such that the mobile sign 10 arrives at each stopping point by a predetermined time before the stopping date and time of the bus 40. A known technology can be used for the autonomous traveling by the traveling unit 101.

In step S203, the traveling unit 101 determines whether the mobile sign 10 has arrived at the stopping point of the bus 40. For example, the traveling unit 101 compares the position information acquired by the position information sensor 15 with the information on the stopping point of the bus 40 included in the operation command acquired from the server 30 and determines whether the mobile sign 10 has arrived at the stopping point. When a positive determination is made in step S203, the process proceeds to step S204, and when a negative determination is made, the process of step S203 is executed again.

In step S204, the notification unit 102 determines whether it is a predetermined time before the stopping date and time of the bus 40. In the present embodiment, the notification indicating that this is the stopping position of the bus 40 is started from a predetermined time before the stopping date and time of the bus 40. However, instead, the mobile sign 10 may start the notification immediately after arriving at the stopping position of the bus 40. Further, the traveling unit 101 may execute the traveling control of the mobile sign 10 such that the mobile sign 10 arrives at the stopping position of the bus 40 a predetermined time before the stopping date and time of the bus 40. When a positive determination is made in step S204, the process proceeds to step S205, and when a negative determination is made, the process of step S204 is executed again.

In step S205, the notification unit 102 executes the notification processing. For example, the notification unit 102 displays the screen illustrated in FIG. 8 on the display 18 or output sound information indicating that this is the stopping point of the bus 40 from the speaker 19. In step S206, the notification unit 102 determines whether the bus 40 has arrived. For example, by communicating with the bus 40 via the network N2, the notification unit 102 may determine whether the bus 40 has arrived. Alternatively, as another method, the server 30 may send, to the mobile sign 10, the notification indicating the arrival of the bus 40 based on the position information received by the server 30 from the bus 40. Alternatively, as yet another method, when the stopping date and time has arrived, the notification unit 102 may consider that the bus 40 has arrived. Alternatively, the notification unit 102 may determine whether the bus 40 has arrived based on a detection value of the environment information sensor 16. In this case, for example, by capturing an image regarding the surroundings of the mobile sign 10 by the environment information sensor 16 and executing image analysis, the notification unit 102 may determine the arrival of the bus 40. When a positive determination is made in step S206, the process proceeds to step S207, and when a negative determination is made, the process of step S206 is executed again.

In step S207, the notification unit 102 ends the notification processing. For example, by turning off the screen displayed on the display 18 or by stopping the sound, the notification unit 102 ends the notification. In step S208, the traveling unit 101 determines whether a next stopping point is present or absent on the route. In other words, the traveling unit 101 determines whether all the stopping points have been passed through (when the next stopping point is absent on the route, all the stopping points have been passed through). When a determination is made that the next stopping is absent in step S208, the process proceeds to step S209, and when a determination is made that the next stopping point is present, the process is returned to step S202 and the mobile sign 10 departs toward the next stopping point.

In step S209, the traveling unit 101 executes the traveling control toward a base station. The base station is a place in which the mobile sign 10 is stored and maintained, and a place in which the mobile sign 10 is charged and the like.

As described above, with the first embodiment, by dispatching the mobile sign 10 to the position at which the bus 40 stops, the user can easily know the stopping position of the bus 40. Further, since the mobile sign 10 sends, to the surrounding vehicle 50 and the like, the notification indicating that this is the position at which the bus 40 stops, it is possible to restrict the vehicle 50 from being parked at or stopping at the bus stop. As such, it is possible to secure the place at which the bus 40 stops. As such, the user is not forced to unnecessarily move. Further, it is possible to smoothly operate the bus 40.

Second Embodiment

Figure 12:
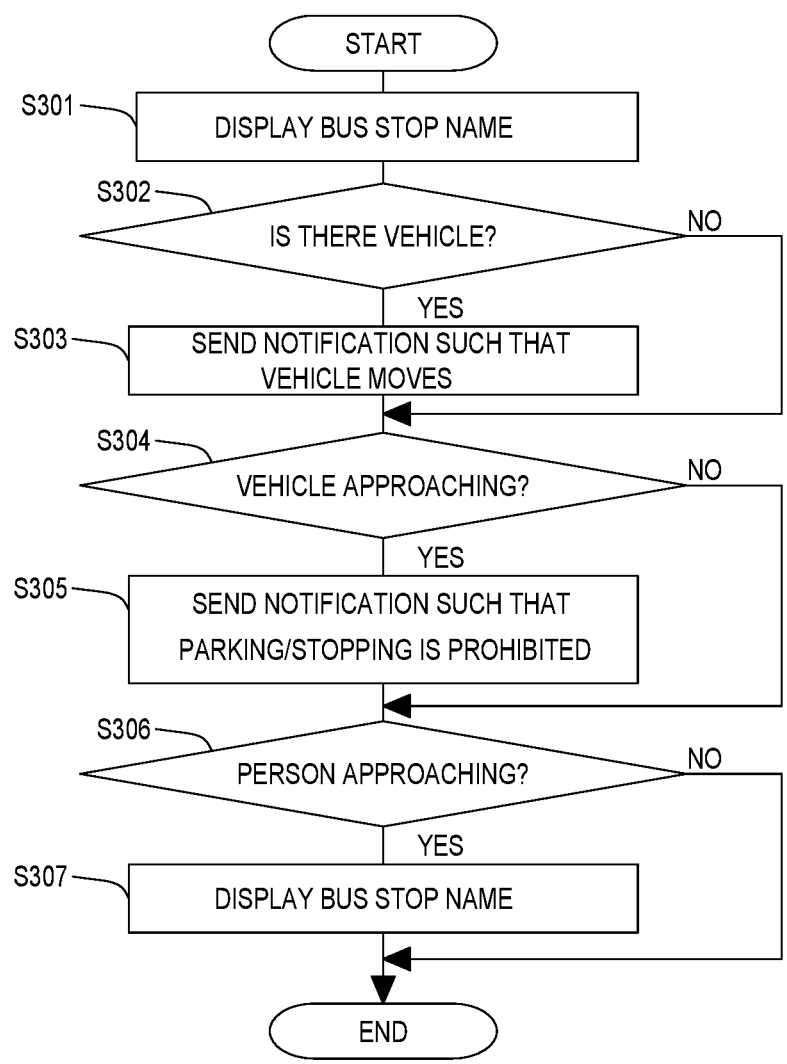
FIG. 12 is a flowchart of notification processing started in step S205 of FIG. 11.

In the first embodiment, the notification is made only by the display 18 or the speaker 19, but in the second embodiment, the content of the notification is changed depending on a situation on the surroundings of the bus stop. FIG. 12 is another flowchart of the notification processing started in step S205 of FIG. 11. The processing illustrated in FIG. 12 is repeatedly executed until a positive determination is made in step S206. The processing illustrated in FIG. 12 is executed according to the operation command transmitted from the server 30.

In step S301, the notification unit 102 displays a bus stop name on the display 18. As such, it is possible to enable the user who boards the bus 40 to learn that the place is the bus stop. In step S302, the notification unit 102 determines whether the vehicle 50 exists in a predetermined area centered around the current place of the mobile sign 10. The predetermined area is a distance in which the stopping of the bus 40 may be interrupted, and may be decided according to, for example, the size of the bus 40. The predetermined area may be designated by the server 30. By, for example, capturing the image regarding the surroundings of the mobile sign 10 by the environment information sensor 16 and executing the image analysis, the notification unit 102 may determine whether the vehicle 50 exists in the predetermined area. Alternatively, as another method, by communicating with the vehicle 50 via the network N1 or the network N2, the notification unit 102 may determine whether the vehicle 50 exists in the predetermined area. When a positive determination is made in step S302, the process proceeds to step S303, and when a negative determination is made, the process proceeds to step S304.

In step S303, the notification unit 102 outputs a notification to move the vehicle 50. The notification unit 102 outputs the notification by, for example, displaying "Please move the vehicle." on the screen of the display 18 or playing the voice "Please move the vehicle." by the speaker 19. When a negative determination is made in step S302, the bus stop name is continuously displayed on the screen of the display 18. When the vehicle 50 is parked, the driver may also move away from the vehicle 50. In this case, it is also conceivable that the driver may not notice the display on the display 18. Therefore, the notification may be made only by voice. At this time, for example, the volume of the notification may be louder than that of a notification in step S305 described below. Alternatively, as another method, for example, the notification unit 102 may capture the image regarding the vehicle 50 by the environment information sensor 16, determine whether there is a driver in the vehicle 50, turn down the volume when there is a driver, and turn up the volume when there is no driver. Alternatively, when there is the driver, the notification unit 102 may output the notification using only the display 18, or output the notification using the display 18 and the speaker 19.

In step S304, the notification unit 102 determines whether the vehicle 50 is approaching the predetermined area. For example, the approaching of the vehicle 50 may be detected based on a detection value of the radar included in the environment information sensor 16. In this case, for example, by capturing an image regarding the surroundings of the mobile sign 10 by the environment information sensor 16 and executing the image analysis, the notification unit 102 may determine the approaching of the vehicle 50. Alternatively, as another method, by communicating with the vehicle 50 via the network N1 or the network N2, the notification unit 102 may determine whether the vehicle 50 exists in the predetermined area. When a positive determination is made in step S304, the process proceeds to step S305, and when a negative determination is made, the process proceeds to step S306.

In step S305, the notification unit 102 outputs the notification such that the vehicle 50 is not parked in the predetermined area. The notification unit 102 outputs the notification by, for example, displaying "This is a bus stop." on the screen of the display 18 or playing the voice "This is a bus stop." by the speaker 19. As such, when a fact that this is the bus stop is delivered to the driver of the vehicle 50, it is possible to restrict the vehicle 50 from being parked. When a negative determination is made in step S304, the notification unit 102 continuously displays the bus stop name on the screen of the display 18 or continuously outputs the notification to move the vehicle 50.

In step S306, the notification unit 102 determines whether a person is approaching the predetermined area. For example, in the same manner as when the approaching of the vehicle 50 is detected, the approaching of a person may be detected based on the detection value of the radar included in the environment information sensor 16 or the image analysis. When a positive determination is made in step S306, the process proceeds to step S307, and when a negative determination is made, this routine ends.

In step S307, the notification unit 102 displays a bus stop name on the display 18. As such, it is possible to enable the person who approaches the bus 40 to know that the place is the bus stop.

As described above, with the second embodiment, it is possible to enhance an effect of the notification by changing the content of the notification depending on the situation.

Third Embodiment

Figure 13:
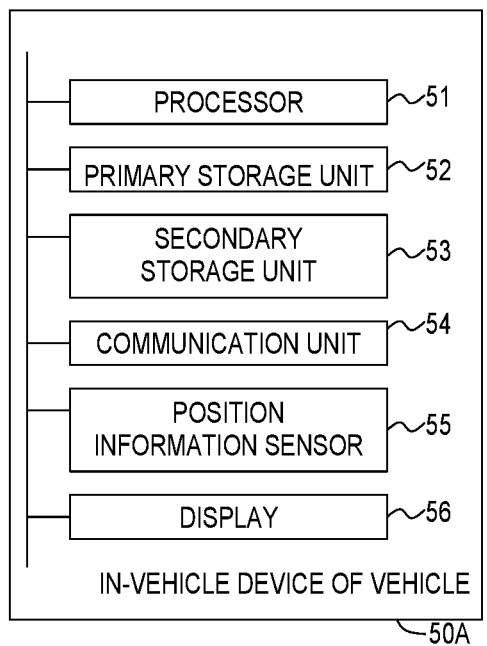
FIG. 13 is a block diagram schematically illustrating an example of a configuration of an in-vehicle device of a vehicle.

In the third embodiment, by communicating with the surrounding vehicle 50, via the communication unit 14, the mobile sign 10 sends the notification indicating that the point is the bus stop. The surrounding vehicle 50 is, for example, a vehicle traveling within a predetermined area including the mobile sign 10, a vehicle approaching the mobile sign 10, and a vehicle parked in the predetermined area including the mobile sign 10. The vehicle 50 may be a vehicle manually driven by a driver, or may be a vehicle that autonomously travels. The vehicle 50 is a vehicle other than the mobile sign 10 and the bus 40. The vehicle 50 includes an in-vehicle device 50A. FIG. 13 is a block diagram schematically illustrating an example of a configuration of the in-vehicle device 50A of the vehicle 50. Since a configuration of each of the mobile sign 10, the user terminal 20, the server 30, and the bus 40 is the same as that of the first embodiment, description thereof will be omitted.

The in-vehicle device 50A has a computer configuration and is typically a navigation system. The vehicle 50 includes a processor 51, a primary storage unit 52, a secondary storage unit 53, a communication unit 54, a position information sensor 55, and a display 56. These are connected to each other by buses. Since the processor 51, the primary storage unit 52, and the secondary storage unit 53 are the same as the processor 31, the primary storage unit 32, and the secondary storage unit 33 of the server 30, description thereof will be omitted. Further, since the communication unit 54 and the position information sensor 55 are the same as the communication unit 14 and the position information sensor 15 of the mobile sign 10, description thereof will be omitted. Further, since the display 56 is the same as the display 25 of the user terminal 20, description thereof will be omitted. The vehicle 50 may be, for example, a vehicle that can autonomously travel. In this case, in the same manner as in the mobile sign 10, the processor 51 may control the vehicle 50 based on the command from the server 30.

Figure 14:
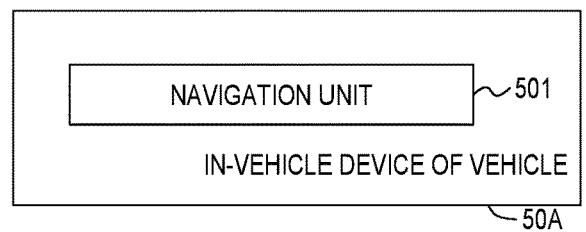
FIG. 14 is a diagram exemplifying a functional configuration of the in-vehicle device of the vehicle.

Next, a function of the in-vehicle device 50A of the vehicle 50 will be described. FIG. 14 is a diagram exemplifying a functional configuration of the in-vehicle device 50A of the vehicle 50. As a functional component, the in-vehicle device 50A of the vehicle 50 includes a navigation unit 501. The processor 51 of the in-vehicle device 50A of the vehicle 50 executes processing of the navigation unit 501 according to a computer program on the primary storage unit 52. However, any one of each functional component or part of the processing may be executed by a hardware circuit.

The navigation unit 501 displays a map on the surroundings of the current place of the vehicle 50 based on the map information stored in the secondary storage unit 53. Further, the navigation unit 501 generates the route of the vehicle 50 according to, for example, an operation of the driver, and guides the driver to the route. The navigation unit 501 displays a map and a route on, for example, the display 56, or guides the driver to a movement direction via voice.

The mobile sign 10 sends, to the surrounding vehicle 50, the notification of the stopping point of the bus 40, via the communication unit 14 from a predetermined time before the stopping date and time of the bus 40 at the stopping position of the bus 40. The data transmitted at this time may be transmitted by broadcasting via, for example, the V2V communication. Further, the data transmitted at this time includes information on the stopping position of the bus 40 and information on the stopping time of the bus 40.

Figure 15:
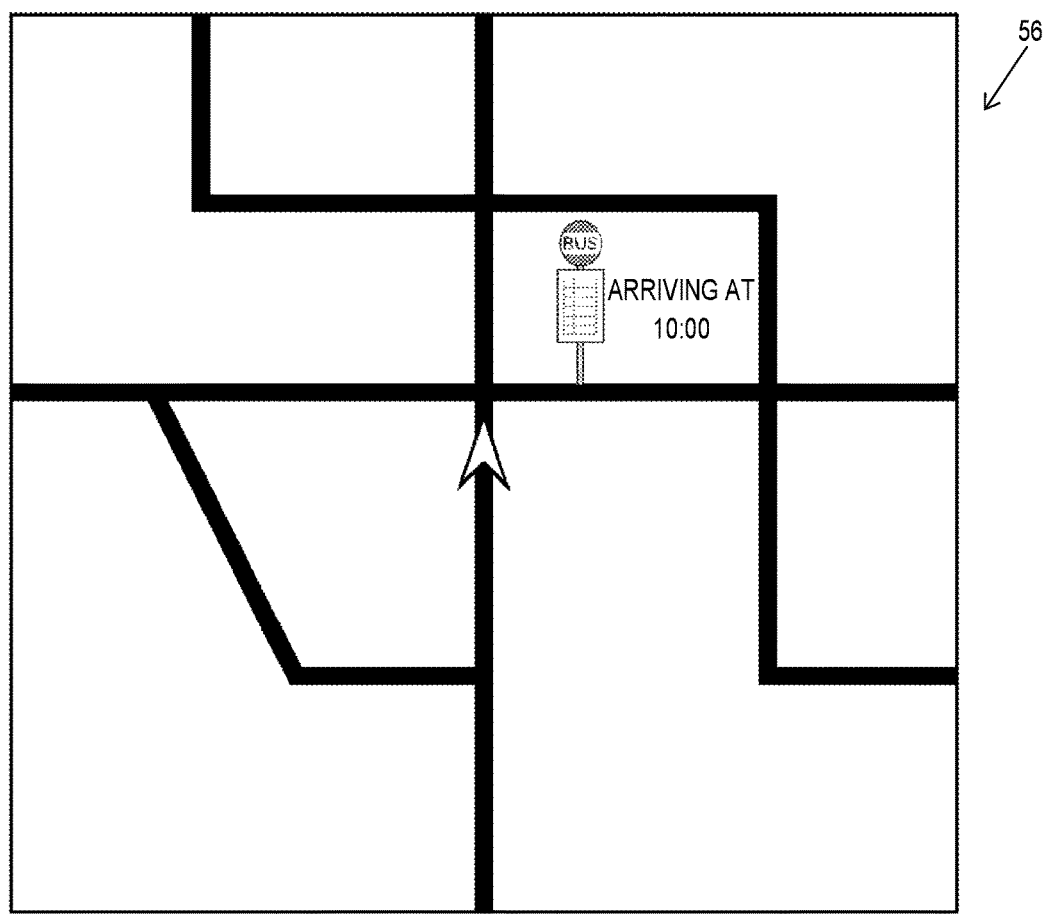
FIG. 15 is an example of a screen when information on a bus is displayed on a display.

Upon receiving the data from the mobile sign 10, the navigation unit 501 displays the map and the stopping position of the bus 40 on the display 56. At that time, for example, the navigation unit 501 also displays the stopping time of the bus 40 or the time remaining until the stopping time of the bus 40 on the display 56. FIG. 15 is an example of a screen when the information on the bus 40 is displayed on the display 56. FIG. 15 is an example where the stopping position and the stopping time of the bus 40 are displayed on the map based on the information transmitted from the mobile sign 10. A road map of a predetermined area on the surroundings of the vehicle 50 is displayed on the screen of the display 56, and an icon of the vehicle 50 is displayed substantially in the center thereof. Further, an icon of the bus stop is displayed at a position corresponding to the stopping position of the bus 40. Further, the arrival time of the bus 40 is displayed next to the icon of the bus stop. As another method, the time remaining until the bus 40 arrives may be displayed next to the icon of the bus stop. By viewing the information displayed on the display 56 in this manner, the driver can grasp the stopping position of the bus 40 on the map.

Alternatively, as another method, when an end point of the route of the vehicle 50 being guided is a predetermined distance from the stopping point of the bus 40, the navigation unit 501 may output, to the driver, a notification indicating that the stopping point of the bus 40 is near with, for example, a sound. Alternatively, as another method, when the vehicle 50 enters the predetermined area from the stopping point of the bus 40, the navigation unit 501 may output, to the driver, the notification indicating that the stopping point of the bus 40 is near with, for example, a sound. Alternatively, when the vehicle 50 is parked within the predetermined area from the stopping point of the bus 40, the navigation unit 501 may output, to the driver, the notification indicating that the stopping point of the bus 40 is near with, for example, a sound. In this case, when, for example, the driver turns off a power switch of the vehicle 50, the navigation unit 501 may determine that it is parked at the place. The predetermined area is a distance in which the stopping of the bus 40 may be interrupted, and may be decided according to, for example, the size of the bus 40.

As described above, with the third embodiment, it is possible to restrict the vehicle 50 from being parked or stopping at the stopping position of the bus 40, and thus it is possible to enable passengers of the bus 40 to smoothly board and exit. Further, the driver of the vehicle 50 receives the notification from the navigation unit 501 of the vehicle 50 even when he/she does not notice the mobile sign 10, and thus it is possible to more reliably inform the driver of the vehicle 50 of the stopping position of the bus 40.

Fourth Embodiment

In a fourth embodiment, an example where the notification is not sent to the vehicle 50 will be described. Even when the vehicle 50 stops at the stopping point of the bus 40, in a case where, for example, it carries a wheelchair, or it is classified as an emergency vehicle, such as an ambulance, a fire truck, or a police vehicle, the notification does not have to be output. The mobile sign 10 may determine a type of the vehicle 50 or that the vehicle 50 carries a wheelchair by, for example, acquiring a feature amount from an image regarding the surroundings of the mobile sign 10 captured by the environment information sensor 16 and executing pattern matching of the feature amount. Alternatively, as another method, when a sticker indicating that the vehicle 50 carries a wheelchair is detected, the mobile sign 10 may determine that it carries a wheelchair. Alternatively, as yet another method, the mobile sign 10 may determine whether the vehicle 50 corresponds to the above kind of vehicle via the V2V communication.

Even in the fourth embodiment, the name of the bus stop is displayed. As such, the fact that the place is a bus stop is displayed.

Figure 16:
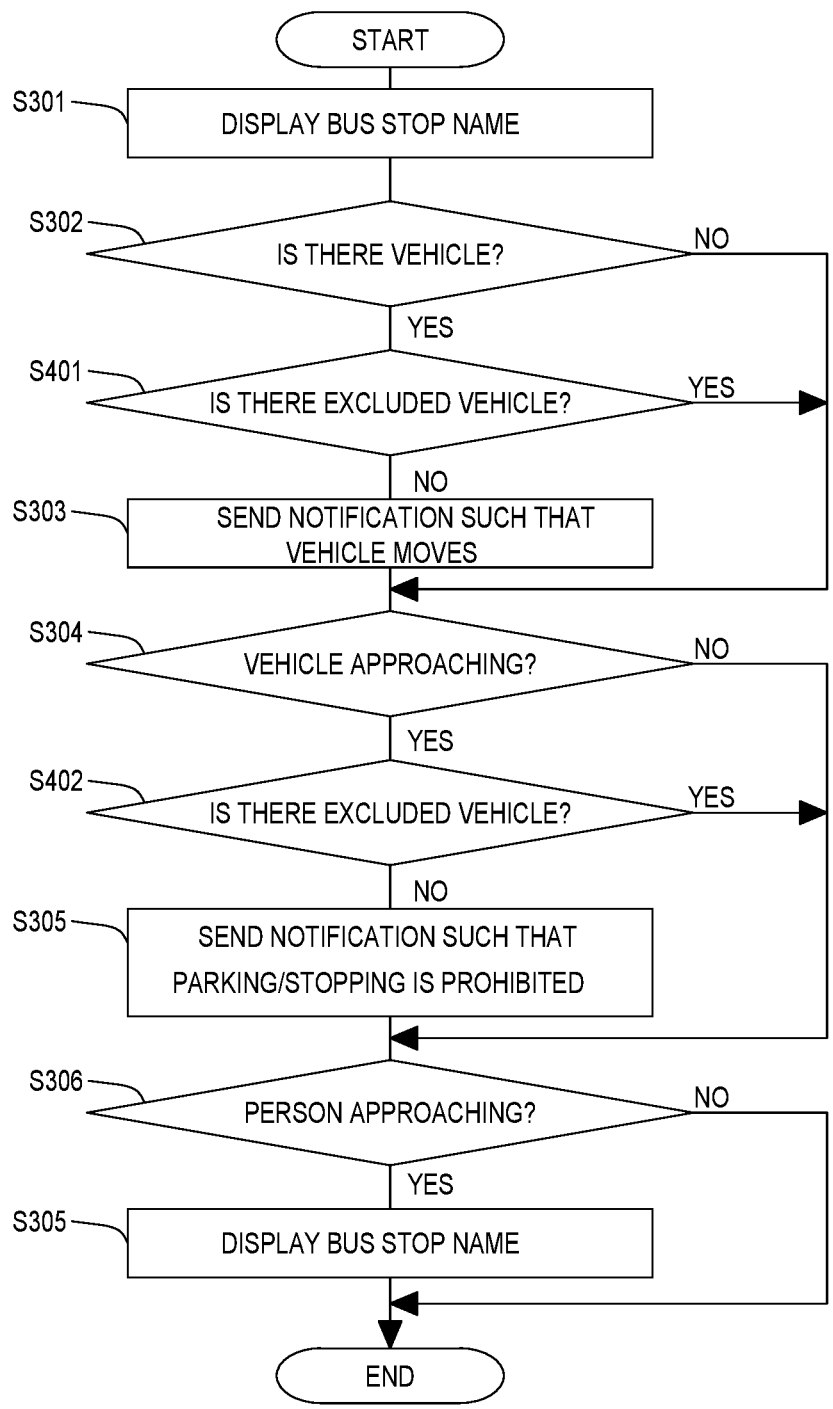
FIG. 16 is another flowchart of the notification processing started in step S205 of FIG. 11.

FIG. 16 is another flowchart of the notification processing started in step S205 of FIG. 11. The processing illustrated in FIG. 16 is repeatedly executed until a positive determination is made in step S206. In FIG. 16, steps in which the same processes as those in FIG. 12 are executed are denoted by the same reference signs, and description thereof will be omitted. The processing illustrated in FIG. 16 is executed according to the operation command transmitted from the server 30.

In the flowchart illustrated in FIG. 16, when a positive determination is made in step S302, the process proceeds to step S401. In step S401, the notification unit 102 determines whether the vehicle 50 existing in the predetermined area is an excluded vehicle. The excluded vehicle is a vehicle 50 that does not receive the notification even when it exists within the predetermined area, and may be, for example, a vehicle carrying a wheelchair or an emergency vehicle. Information on the excluded vehicle is stored in, for example, the secondary storage unit 33 of the server 30, and is transmitted from the server 30 to, for example, the mobile sign 10, together with the operation command. Then, the information on the excluded vehicle is stored in the secondary storage unit 13. The information on the excluded vehicle includes, for example, information on the feature amount when the image analysis is executed. When a positive determination is made in step S401, the process proceeds to step S304 without outputting the notification, and when a negative determination is made, the process proceeds to step S303.

Further, in the flowchart illustrated in FIG. 16, when a positive determination is made in step S304, the process proceeds to step S402. In step S402, the notification unit 102 determines whether the vehicle 50 approaching the predetermined area is the excluded vehicle. When a positive determination is made in step S402, the process proceeds to step S306 without outputting the notification, and when a negative determination is made, the process proceeds to step S305.

As described above, with the fourth embodiment, it is possible to improve convenience for people traveling in the vehicle 50 by setting the excluded vehicle to which the notification is not sent.

Other Embodiments

The above embodiments are merely examples, and appropriate modifications may be implemented within a range not departing from the scope of the present disclosure.

The processes or elements described in the present disclosure can be freely combined and implemented within a range in which no technical contradiction arises.

Further, the processing described as being executed by one device may be executed in a shared manner by a plurality of devices. Alternatively, processing described as being executed by different devices may be performed by one device. In the computer system, the hardware configuration (the server configuration) that implements each function can be flexibly changed. For example, part of the function of the server 30 may be included in the mobile sign 10.

For example, the mobile sign 10 may be configured to voluntarily execute the notification processing at the stopping position of the bus 40. For example, when the stopping position and the stopping time of the bus 40 are received from the server 30, the mobile sign 10 includes a program that starts outputting the notification to the surroundings of the stopping position of the bus 40 a predetermined time before the stopping time of the bus 40. The program may be stored in the primary storage unit 12 of the processor 11 to execute the notification.

The present disclosure can also be realized by supplying a computer with a computer program that implements the functions described in the above embodiments and modified examples, and reading and executing the program by one or more processors included in the computer. Such a computer program may be provided to a computer by a non-transitory computer-readable storage medium that can be connected to a system bus of the computer, or may be provided to the computer via a network. Examples of the non-transitory computer-readable storage medium include any kind of disk, such as a magnetic disk (a Floppy® disk, an HDD, and the like), an optical disk (a CD-ROM, a DVD disk, a Blu-ray disc, and the like), a ROM, a RAM, an EPROM, an EEPROM, a magnetic card, a flash memory, an optical card, and any kind of medium suitable for storing electronic commands.

What is claimed is:

1. An information processing apparatus comprising:
a processor configured to generate a command for instructing a display device that is movable and is configured to display information representing that a place where the display device exists is a bus stop to output, at a point determined as the bus stop, a notification indicating that a bus stops at the point a predetermined time before a time at which the bus stops at the point, wherein
the display device is configured to travel autonomously.

2. The information processing apparatus according to claim 1, wherein the processor is configured to transmit, to the display device, a moving command for instructing the display device to move such that the display device arrives at the point determined as the bus stop by the predetermined time before the time at which the bus stops.

3. The information processing apparatus according to claim 1, wherein the processor is configured to determine the point as the bus stop based on information on a boarding point or an exiting point of the bus received from a user terminal.

4. The information processing apparatus according to claim 1, wherein the processor is configured to include, in the command, an instruction to display an image regarding a stop of the bus at the point on a display included in the display device.

5. The information processing apparatus according to claim 1, wherein the processor is configured to include, in the command, an instruction to play a sound regarding a stop of the bus at the point from a speaker included in the display device.

6. The information processing apparatus according to claim 1, wherein the processor is configured to generate the command for instructing the display device to send a notification indicating that the bus stops at the point, to one or more vehicles other than the bus via communication with the one or more vehicles.

7. The information processing apparatus according to claim 6, wherein the one or more vehicles includes a vehicle traveling within a predetermined range including the display device and approaching the display device.

8. The information processing apparatus according to claim 6, wherein the one or more vehicles includes a vehicle parked within a predetermined range including the display device.

9. The information processing apparatus according to claim 6, wherein the processor is configured to include, in the command, an instruction to display the point determined as the bus stop on a map of a navigation system of the one or more vehicles.

10. The information processing apparatus according to claim 6, further comprising a storage unit that stores information on a predetermined excluded vehicle to which the notification indicating that the bus stops at the point is not sent,
wherein the processor is configured to generate the command for instructing the display device not to send the notification indicating that the bus stops at the point to the predetermined excluded vehicle.

11. The information processing apparatus according to claim 1, wherein the processor is configured to include, in the command, an instruction to output a notification indicating a time at which the bus arrives at the point determined as the bus stop or a time remaining until the bus arrives at the point determined as the bus stop.

12. An information processing method executed by a computer, the information processing method comprising:
generating a command for instructing a display device that is movable and is configured to display information representing that a place where the display device exists is a bus stop to output, at a point determined as the bus stop, a notification indicating that a bus stops at the point a predetermined time before a time at which the bus stops at the point, wherein
the display device is configured to travel autonomously.

13. The information processing method according to claim 12, further comprising transmitting, to the display device, a moving command for instructing the display device to move such that the display device arrives at the point determined as the bus stop by the predetermined time before the time at which the bus stops.

14. The information processing method according to claim 12, further comprising determining the point as the bus stop based on information on a boarding point or an exiting point of the bus received from a user terminal.

15. The information processing method according to claim 12, further comprising including, in the command, an instruction to display an image regarding a stop of the bus at the point on a display included in the display device.

16. The information processing method according to claim 12, further comprising including, in the command, an instruction to play a sound regarding a stop of the bus at the point from a speaker included in the display device.

17. The information processing method according to claim 12, further comprising generating the command for instructing the display device to send a notification indicating that the bus stops at the point, to one or more vehicles other than the bus via communication with the one or more vehicles.

18. The information processing method according to claim 12, further comprising including, in the command, an instruction to output a notification indicating a time at which the bus arrives at the point determined as the bus stop or a time remaining until the bus arrives at the point determined as the bus stop.

19. A mobile object comprising:
a display, and
a processor configured to:
cause the mobile object to autonomously move to a point determined as a bus stop;
cause the display to display information representing that a place where the mobile object is present is the bus stop at the point determined as the bus stop; and
output, at the point determined as the bus stop, a notification indicating that a bus stops at the point from a predetermined time before a time at which the bus stops at the point.

20. The mobile object according to claim 19, wherein the processor is configured to cause the mobile object to move such that the mobile object arrives at the point determined as the bus stop by the predetermined time before the time at which the bus stops.

* * * * *